(12) United States Patent
Schwuger et al.

(10) Patent No.: US 6,637,573 B1
(45) Date of Patent: Oct. 28, 2003

(54) SLIP JOINT OF A SYNCHRONIZATION UNIT FOR TRANSMISSIONS

(75) Inventors: Josef Schwuger, Höchstadt (DE); Rudolf Sinner, Bubenreuth (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 10/030,950

(22) PCT Filed: May 10, 2000

(86) PCT No.: PCT/EP00/04163

§ 371 (c)(1),
(2), (4) Date: Feb. 12, 2002

(87) PCT Pub. No.: WO01/04505

PCT Pub. Date: Jan. 18, 2001

(30) Foreign Application Priority Data

Jul. 10, 1999 (DE) .................................. 199 32 300

(51) Int. Cl.[7] .............................................. F16D 23/06
(52) U.S. Cl. .................. 192/69.9; 192/53.361; 192/114 R
(58) Field of Search ................ 192/53.361, 53.36, 192/53.4, 69.9, 114 R; 74/527

(56) References Cited

U.S. PATENT DOCUMENTS

| 2,085,019 A | * | 6/1937 | Griswold | 192/53.361 |
|---|---|---|---|---|
| 2,201,169 A | * | 5/1940 | Griswold | 192/53.361 |
| 2,521,730 A | * | 9/1950 | Keese | 192/53.361 |
| 3,354,739 A | * | 11/1967 | Ivanchich | 74/339 |
| 4,378,710 A | * | 4/1983 | Knodel | 192/114 R |
| 5,096,037 A | | 3/1992 | Knoess et al. | |
| 5,701,574 A | | 12/1997 | Derflinger et al. | |
| 5,862,900 A | * | 1/1999 | Sailler et al. | 192/114 R |

FOREIGN PATENT DOCUMENTS

| DE | 4418632 | 12/1994 |
|---|---|---|
| DE | 19580558 | 1/1998 |
| DE | 198 09 039 A1 | * 9/1999 |
| EP | 0955481 | 11/1999 |
| GB | 2 029 519 A | * 3/1980 |

OTHER PUBLICATIONS

English Abstract of DE 198 09 039 (German Reference).

* cited by examiner

Primary Examiner—Rodney H. Bonck
(74) Attorney, Agent, or Firm—Muserlian, Lucas and Mercanti

(57) ABSTRACT

In a sliding sleeve (1) of a synchronizing unit having inward directed teeth (2, 11) configured on the inner periphery of the sliding sleeve, the teeth (11) comprise recesses (11a) formed by plastic displacement of material out of the teeth (11).

3 Claims, 2 Drawing Sheets

SLIP JOINT OF A SYNCHRONIZATION UNIT FOR TRANSMISSIONS

This application is a 371 of PCT/EP00/04163 filed May 10, 2000.

FIELD OF THE INVENTION

The invention concerns a sliding sleeve of a synchronizing unit, comprising inward directed teeth formed on an inner periphery of the sliding sleeve, the flanks of the teeth extending longitudinally of the central axis of the sliding sleeve, the inward directed teeth meshing with an outer toothing of a synchronizer body that receives the sliding sleeve for longitudinal displacement, and at least one of the inward directed teeth comprising at least one recess that is made at least in the inward pointing free end of the tooth and extends toward the base of the tooth.

BACKGROUND OF THE INVENTION

Sliding sleeves of the pre-cited type are used as a rule as coupling elements in synchronizing devices of modern manual vehicle transmissions. They connect a transmission shaft rotationally fast to a gearwheel mounted for rotation on the transmission shaft. The sliding sleeve is seated concentrically with the transmission shaft on a synchronizer body while being fixed in rotation but slidable in longitudinal direction of the transmission shaft and adapted to be coupled to a gearwheel.

Sliding sleeves exist in various designs and generally comprise on their inner peripheral surface, an inward pointing toothing that meshes with a mating toothing of a synchronizer body and in the gear-engaged state, with a toothing of the gearwheel. The outer toothing of the sliding sleeve comprises a guide for a gearshift fork. With the help of the gearshift fork, the sliding sleeve is displaced in longitudinal direction on the synchronizer body till it is connected to the gearwheel or till it is displaced back into its neutral position.

In the neutral position, sliding sleeves are often retained in an axial direction by a detent element that is received in the synchronizer body and generally acts through spring bias on a recess. Depending on the configuration of the locking arrangement, the recess is configured on individual or on all inward directed teeth of the sliding sleeve. The function of the detent element is to assure that the sliding sleeve can be axially moved for shifting gears only when a defined resistance has been overcome by the operating person and that it cannot be displaced in axial direction unintentionally or on its own. To fix different locking points, e. g. for a neutral and a locked position, or to define displacing forces or force flows of different magnitude, two or more recesses are often arranged behind one another in longitudinal direction of the teeth.

In other synchronizing devices, thrust pieces or other locking elements act in addition to, or independently of the aforesaid detent elements on the recesses of the inward directed teeth. The thrust pieces serve as actuating elements for the process of pre-synchronization. When the sliding sleeve is axially displaced, it entrains the thrust pieces in axial direction so that the thrust pieces initiate the process of synchronization through their action on synchronizing rings that are arranged between the gearwheel and the synchronizer body.

DE 195 80 558 C1, for example, describes a synchronizing unit in which thrust pieces are arranged in spaced relationship on the periphery of the synchronizer body. Each of these thrust pieces is combined with a locking element and acts on a corresponding recess in a tooth.

Locking elements are used, for example, to prevent a premature engaging of a gear in the presence of high differential speeds of rotation. In such a case, the locking element is locked in the recess, for example, by centrifugal force and prevents an axial displacement of the sliding sleeve.

The toothings of the sliding sleeve and the synchronizer body mesh with each other for relative longitudinal displacement. Toothings of the most different configurations are used in practice. These can have both differently configured and differently arranged teeth. The toothing is configured, for example, as represented in DE 195 80 558 C1, so that the sliding sleeve comprises a circumferentially continuous gear ring with equally spaced (uniform pitch), inward directed teeth. The associated mating toothing of the synchronizer body comprises a gear ring with the same pitch but in place of the outward directed teeth, a plurality of gaps of equal width which exceeds the normal width of a tooth gap are arranged on the outer periphery of the gear ring for receiving the thrust piece.

The aforesaid recesses in the sliding sleeve on which the above-mentioned thrust pieces, detent elements etc. act, are usually made in the form of a circumferential groove by a machining method. This means that all the teeth of the gear ring concerned have such a recess. It is more seldom that machined recesses are made only on those individual teeth that are actually acted upon by the aforesaid elements. This is done particularly when a number of circumferentially spaced have to be provided with differently configured recesses or if it is to be expected that a circumferential groove would impermissibly lessen the bearing capacity of the teeth. The costs for making the recesses in individual teeth of a gear ring are correspondingly high. Therefore, as a rule, it is preferred to provide the above-mentioned circumferential groove. If there are bearing problems, the teeth that are weakened by the recess are configured with a larger thickness i.e., they are made out of more material which results in the drawback of increased material consumption.

Sliding sleeves whose teeth are arranged with a uniform pitch and in whose gear ring only individual teeth comprise recesses, have to be mounted properly oriented on the synchronizer body. The teeth comprising the recesses must be positioned exactly opposite the elements. To avoid errors in mounting, appropriate corresponding marks are provided on the sliding sleeve and the synchronizer body. In other known solutions, barriers are provided in the gear rings of the synchronizer bodies and in the sliding sleeves, which barriers can be configured, for example, in the form of a very wide tooth and an appropriate gap. These barriers assure that during mounting of the sliding sleeve on the synchronizer body, the recess actually registers with the associated element. The first solution still does not reliably exclude errors of mounting. The drawback of the second solution lies in the increased costs due to the separate work steps required for making the barrier.

It is common knowledge that the making of grooves and recesses by a machining method involves high fabrication costs, particularly due to the processing time required. The processing time for making the said recesses is a particularly weighty factor because the surfaces of the recesses, as a rule, have to be given a fine finishing due to their frictional contact with the detent or other elements.

Machining methods impose great restrictions on the configuration of the contour of the recesses, so that, as a rule, the contour is not optimally adapted to the contact and friction conditions existing between the sliding sleeve and the detent or other elements. Thus, for example, the contact width of the contact surface between the detent element and the sliding sleeve is determined by the width of the tooth in which the recess is made. The contour of the contact surface is mostly determined by the machining method used and the shape and direction of movement of the machining tool and not by the functionally required contact conditions.

SUMMARY OF THE INVENTION

The object of the invention is therefore to provide a sliding sleeve in which the recesses can be made in an economic manner and in which particularly the contour of the recesses can be configured, for the most part, at will and can therefore be determined as a function of the contact conditions required.

The invention achieves this object in that the recess is formed by a plastic displacement of material out of the tooth, and the displaced material extends, at least on one side of the tooth as viewed in peripheral direction, beyond the contour of the flank and into a tooth gap. The recess is therefore formed by shaping without chip removal. A recess of this configuration is obtained, for example, by stamping, rolling or roller burnishing of previously machined or shaped sliding sleeves comprising the toothing. The sliding sleeves are made of any metallic material but preferably of steel. The invention can be implemented on sliding sleeves with teeth of any possible configuration and which may be uniformly or irregularly spaced from one another. The material is displaced plastically out of the tooth toward the base of the tooth and beyond the normal flank contour of the tooth into the gap adjoining the tooth in one direction or into the gaps adjoining the tooth on both sides. The use of shaping methods renders every kind of machining superfluous. In addition, the recesses can be made just as simply in all the teeth of the gear ring as in individual teeth only. The required surface fineness of the contact surfaces or contours which cooperate with the detent or other elements is guaranteed by the texture obtained with the shaping method. Compared to machining methods, the processing time for making the recesses is shorter. The contours of the recesses can be adapted almost unrestrictedly to the structural requirements and are hardly determined by the fabrication method.

The contour of the recesses can be particularly advantageously adapted to the conditions of contact of the detent element or of the other aforesaid elements if the displaced material extends, as far as possible, equally beyond the contour of the tooth flank on both sides of the tooth. The displaced material can be used to form a part of the contact surface. The support surface for the element is thus enlarged. Under certain circumstances, this can reduce the contact pressure and the wear on the contact surfaces. The support conditions are generally improved and, with an appropriate shaping of the displaced material, the element receives an improved lateral guidance as viewed in peripheral direction of the sliding sleeve.

The invention further concerns a sliding sleeve in which a sliding sleeve is arranged on a synchronizer body in which at least one outward directed tooth is replaced with a longitudinal groove or a radially inward extending reception in which a detent element or one of the other aforesaid elements is received. Therefore, in this sliding sleeve, only individual teeth comprise a recess. This recess can be provided in one or two or even more adjoining teeth, in peripheral direction. In this embodiment of the sliding sleeve of the invention, the recesses are likewise made by a plastic displacement of material out of the tooth, and the displaced material extends, at least on one side of the tooth as viewed in peripheral direction, beyond the contour of the flank and into at least one adjoining tooth gap, and when the sliding sleeve is being pushed onto the synchronizer body, the material extending into the gap forms a barrier against a pushing-in of an outward directed tooth of the outer toothing of the synchronizer body into the gap. The reception or the longitudinal groove of the synchronizer body lodging the detent or other element that acts on the recess or recesses is arranged opposite the tooth or the consecutive teeth that comprise the recess or recesses. To assure that the teeth of the sliding sleeve comprising the recesses come to be positioned exactly opposite the detent element or the other element in peripheral direction during assembly of the synchronizing device, so much material is displaced out of the tooth into the adjoining gap or gaps that an outward directed tooth of the synchronizer body, due to its dimensions in longitudinal direction, cannot be pushed into such a gap. The teeth having the recesses therefore fit compulsorily only into the longitudinal groove or into the region of the reception on the synchronizer body. Due to this barrier formed by the displaced material, the sliding sleeve cannot be pushed onto the synchronizer body in a wrong position. In this solution, no additional processing is required form making the barrier, and errors of mounting are excluded.

Finally, according to another feature of the invention that applies to all the embodiments of the sliding sleeve described herein, in an original state, at least the base body of the sliding sleeve comprising the inward directed teeth is a sheet metal strip profiled on at least one side. After the sheet metal strip has been given the required profile comprising the toothing, the recess and other profile elements, it is bend into a circular shape, its cut edges are brought together and joined to each other. The recess is formed by a stamping or by a rolled-in contour. The gearshift fork guide of the sliding sleeve and, if required also further elements of the sliding sleeve are fabricated separately and then fixed on the base body, or they are made already in one piece with the base body. Sliding sleeves of this type can be fabricated economically, particularly in mass production. The shaping process for forming the recesses is integrated into the overall shaping process for forming the profile of the sheet metal strip with the toothing and therefore requires no separate processing time. Practically no waste material is produced in the fabrication of such sliding sleeves.

BRIEF DESCRIPTION OF THE DRAWINGS

The invention will be described in the following with reference to two examples of embodiment. In the drawings.

DETAILED DESCRIPTION OF THE DRAWINGS

Figure 1:
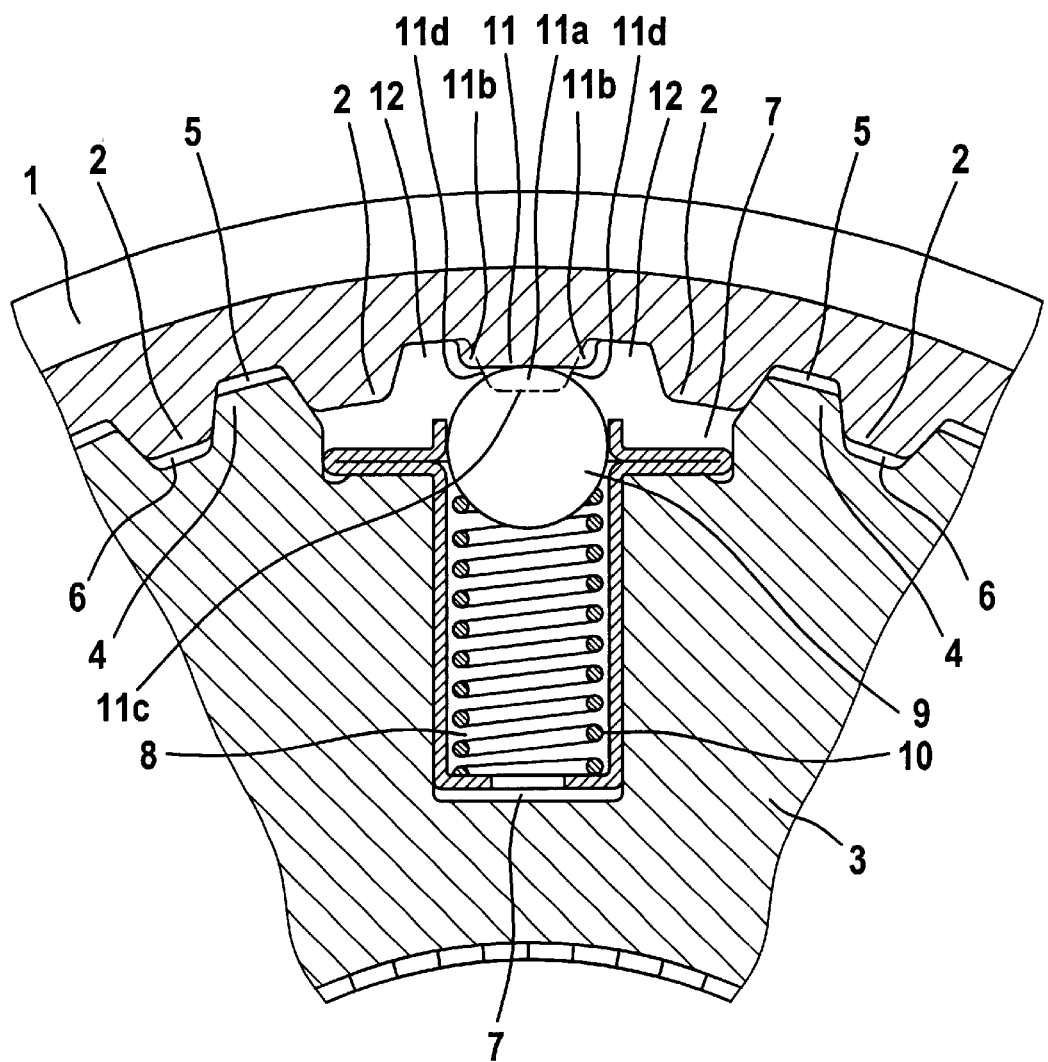
FIG. 1 is a partial sectional view of one example of embodiment of the sliding sleeve of the invention, seated on a synchronizer body.

FIG. 1 is a partial view of a sliding sleeve 1 comprising inward directed teeth 2 that engage into tooth gaps 6 of a synchronizer body 3. Outward directed teeth of the outer toothing 4 of the synchronizer body 3, in turn, engage into tooth gaps 5 of the sliding sleeve 1. A longitudinal groove 7 is configured in the synchronizer body 3. A detent element 8 is received and guided in the longitudinal groove 7. Through a ball 9 that is biased by a compression spring 10, the detent element 8 acts on a recess 11a made in the inward pointing free end 11c of one tooth 11. On each side of the tooth 11, the plastically displaced material extends beyond the contour of the flanks 11d into a gap 12. The displaced material 11b reduces the cross-section of the gap 12, so that the cross-section of the gap 12 is substantially smaller than the cross-section of a tooth gap 5. An outward directed tooth of the outer toothing 4 does not have sufficient place in a gap 12 because the contour of the outward directed teeth is matched to the cross-section of the tooth gap 5.

Figure 2:
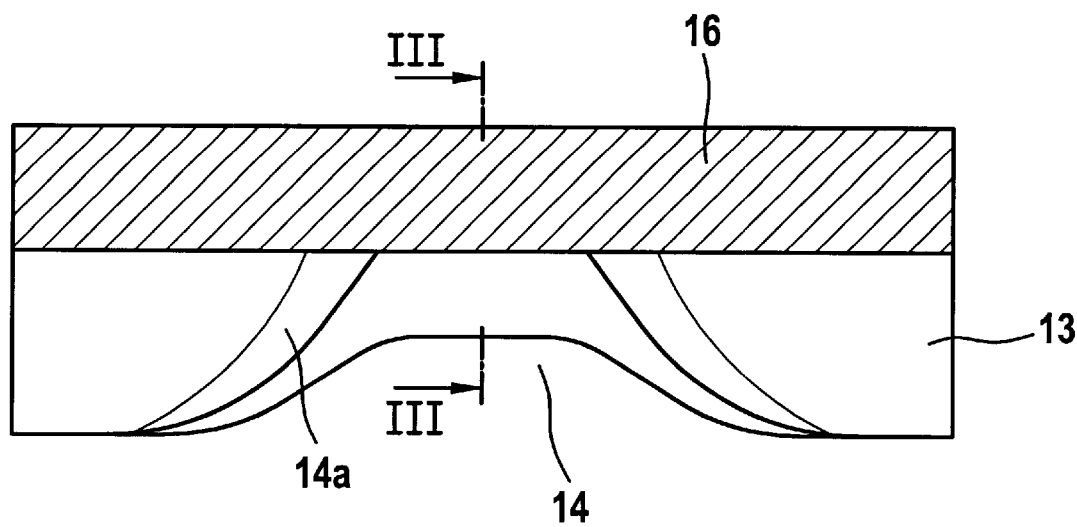
FIG. 2 shows an example of embodiment of a tooth of a sliding sleeve of the invention.
Figure 3:
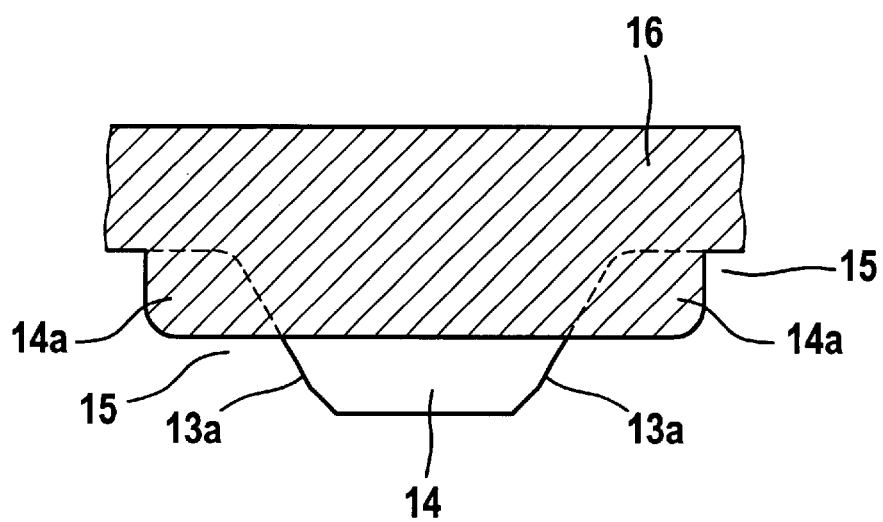
FIG. 3 is a longitudinal section through the tooth of FIG. 2 taken along line III—III, with adjoining tooth gaps, in a stretched representation of a portion of a profiled sheet metal strip.

FIGS. 2 and 3 show an example of embodiment of a tooth 13 of a sliding sleeve of the invention, not shown. A recess 14 is made in the tooth 13. The material 14a displaced out of the tooth 13 for making the recess 14 extends on each side of the tooth 13 beyond the flanks 13a of the tooth 13 into a tooth gap 15. As can be seen in FIG. 3, the tooth 13 comprising the recess 14 is made as profile in a profiled sheet metal strip 16. This sheet metal strip 16, which is flat in its original state, is bent into a circular shape after profiling, its cut ends are then brought together and joined to each other.

Reference Numerals 1 sliding sleeve
2 inward directed tooth
3 synchronizer body
4 outer toothing
5 tooth gap
6 tooth gap
7 longitudinal groove
8 detent element
9 ball
10 compression spring
11 tooth
11a recess
11b displaced material
11c inward pointing free end
11d flank
12 gap
13 tooth
13a flank
14 recess
14a displaced material
15 tooth gap
16 sheet metal strip

What is claimed is:

1. A sliding sleeve (1) of a synchronizing unit, said sliding sleeve (1) comprising inward directed teeth (2) formed on an inner periphery of the sliding sleeve (1), the flanks (11d) of the inward directed teeth extending longitudinally of a central axis of the sliding sleeve (1), the inward directed teeth (2) meshing with an outer toothing (4) of a synchronizer body (3) that receives the sliding sleeve (1) for longitudinal displacement, and at least one tooth (11) of the inward directed teeth (2) comprising at least one recess (11a) that is made at least in the inward pointing free end (11c) of the tooth and extends toward the base of the tooth, characterized in that the recess (11a) is formed by a plastic displacement of material out of the tooth (11), and the displaced material (11b) extends, at least on one side of the tooth (11) as viewed in peripheral direction, beyond the contour of the flank (11d) and into at least one adjoining tooth gap (12).

2. A sliding sleeve of a synchronizing unit, said sliding sleeve comprising inward directed teeth (2) formed on an inner periphery of the sliding sleeve, said sliding sleeve (1) having the following features:

contours of the inward directed teeth (2) when projected in longitudinal direction are identical, flanks of the teeth (2) extend longitudinally of a central axis of the sliding sleeve (1), the inward directed teeth (2) mesh with an outer toothing (4) of a synchronizer body (3) that receives the sliding sleeve (1) for longitudinal displacement, the inward directed teeth (2) are arranged with a uniform pitch on the periphery, at least one further inward directed tooth (11) is arranged between the inward directed teeth (2), said further inward directed tooth (11) comprising at least one recess (11a) that is made at least in the inward pointing free end (11c) of the tooth (11) and extends toward the base of the tooth, in place of at least one outward directed tooth of the outer toothing (4), a longitudinal groove (7) or a radially inward extending reception is arranged opposite the recess (11a) on the synchronizer body (3), and at least one detent element (8) or locking element cooperating with the recess (11a) is guided in the longitudinal groove (7) or in the reception, characterized in that the recess (11a) is formed by a plastic displacement of material out of the inward directed tooth (11), and the displaced material (11b) extends, at least on one side of the tooth (11) as viewed in peripheral direction, beyond the contour of flank (11d) and into a gap (12), and, when the sliding sleeve (1) is being pushed onto the synchronizer body (3), the material (11b) extending into the gap (12) forms a barrier against a pushing-in of an outward directed tooth (4) into the gap (12).

3. A sliding sleeve according to claim 1, characterized in that, in an original state, at least a base body of the sliding sleeve (1) comprising the inward directed teeth (2, 11, 13) is a sheet metal strip (16) that is profiled on at least one side, which sheet metal strip (16) is bent into a circular shape and whose cut ends are brought together and joined to each other, while the recess (11, 14) is formed by a stamping or a rolled-in contour.

* * * * *